March 29, 1932.  B. STOCKFLETH  1,851,934

BEARING LINER OR SLEEVE

Filed June 5, 1928  2 Sheets-Sheet 1

Witness:
Harry R. [illegible]

Inventor
Berger Stockfleth
By Edward Fay Wilson
Atty.

March 29, 1932.   B. STOCKFLETH   1,851,934
BEARING LINER OR SLEEVE
Filed June 5, 1928   2 Sheets-Sheet 2

Witness:
Harry R. L. White.

Inventor
Berger Stockfleth
By Edward Fay Wilson
Atty.

Patented Mar. 29, 1932

1,851,934

UNITED STATES PATENT OFFICE

BERGER STOCKFLETH, OF NILES, MICHIGAN, ASSIGNOR TO HYDRAULIC PRESSED BEARING COMPANY, OF WILMINGTON, DELAWARE, A CORPORATION OF DELAWARE

BEARING LINER OR SLEEVE

Application filed June 5, 1928. Serial No. 283,109.

This invention relates to improvements in bearing sleeves or shells and has special reference to the production of such shells sized within the allowable limits or tolerances and provided with projections on the backs of the shells by which the shells or liners are doweled to the housings in which they are used, the doweling projections being integral with the shells.

These shells or bearing liners are semi-cylindrical both inside and outside and have heretofore been produced by cutting tools which necessitated the separate application of the doweling projections which was not only expensive, but lacked that positive degree of accuracy as to position, size, etc., which is an essential in modern high speed interchangeable production.

By means of my invention I am enabled to produce accurately sized shells in large volume at low cost and either made wholly of Babbitt metal, or the like, or with a harder metal backing made of steel, brass or bronze and an inner lining or layer of babbitt or the like, and in each instance or type provided with an accurately placed and dimensioned doweling projection on the back of the shell.

In the hereindescribed method of producing such bearing liners, the process applies more particularly to liners which have harder metal backs.

The process consists in producing a harder metal back slightly shorter both circumferentially and longitudinally than the finished dimensions and slightly thicker radially. This harder metal backing preferably has the doweling projection on its back or outer surface at least partly formed, and may be either perforated or solid. The back is then tinned to cause the Babbitt metal to adhere to the inner surface and the Babbitt metal, which forms the inner wearing surface of the sleeve when finished, is preferably cast in place in accordance with the method disclosed in my companion application, filed August 20, 1928, Serial Number 300,757. In the casting of the Babbitt metal upon the backing, I may provide an excrescence on the inner side of the sleeve opposite to the projection on the back.

The sleeve is then formed, sized and finished in a pair of dies which accurately size the sleeve as to all dimensions, the dies being provided with one or more die openings through which the excess Babbitt metal is extruded. The die is provided with an opening or pocket into which the partly formed projection on the back of the sleeve is forced, the excrescence on the inner side of the sleeve, when such is used, assisting in this action.

In the case of the partly formed projection being perforated, the Babbitt metal is forced through the opening to assist in filling the projection-forming pocket in the die. In this case the excrescence on the inner surface furnishes the metal for this purpose as well as for applying pressure for expanding and forming the projection to accurately fill the pocket.

Another advantage of the production of the projection in this manner is that without additional cost suitable or desired markings can be produced upon the outer flat surface of the projection in the forming process thus simplifying the designation of particular sleeves for special uses. Or the marking may be a suitable trade-mark or a notification that the bearing has been produced under certain patents.

My invention will be more readily understood by reference to the accompanying drawings forming part of the specification and in which—

Figure 3:
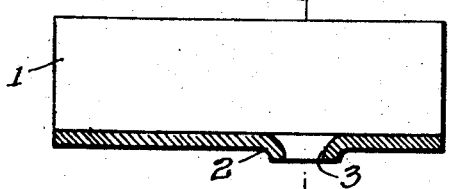
Fig. 3 is a central longitudinal section of one of the backings for a bearing sleeve.

In said drawings I have shown a semi-cylindrical backing 1 such as I provide in the production of my improved bearing lining. This backing is preferably formed in a press out of sheet metal such as steel, bronze or brass and in the forming process is provided with a formed out projection 2 on its back which is preferably, though not necessarily perforated being open at its bottom, as shown at 3, Fig. 3.

Figure 4:
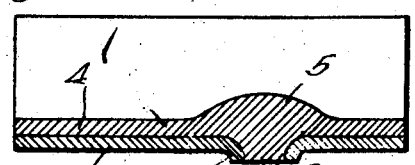
Fig. 4 is a central longitudinal section of a bearing sleeve taken on the line 4—4 of Fig. 1, and showing the backing with the Babbitt metal lining prepared for the final forming operation.

In the process of producing a bearing lining or sleeve the next step is to tin the blank back 1 and then cast a Babbitt metal lining within the backing, as shown at 4, Fig. 4. This lining is preferably provided with a rounded excrescence 5 opposite to the projection 2 to provide metal to complete the interlocking projection. Having produced the Babbitt metal lining 4 preferably in accordance with the method disclosed in my said copending application, I next proceed to complete the bearing sleeve by applying a heavy pressure thereto in dies made for the purpose. Suitable dies and their operation are fully disclosed in U. S. Patent No 1,722,995, issued to Frederick W. Burger and Berger Stockfleth on August 6, 1929.

Figure 1:
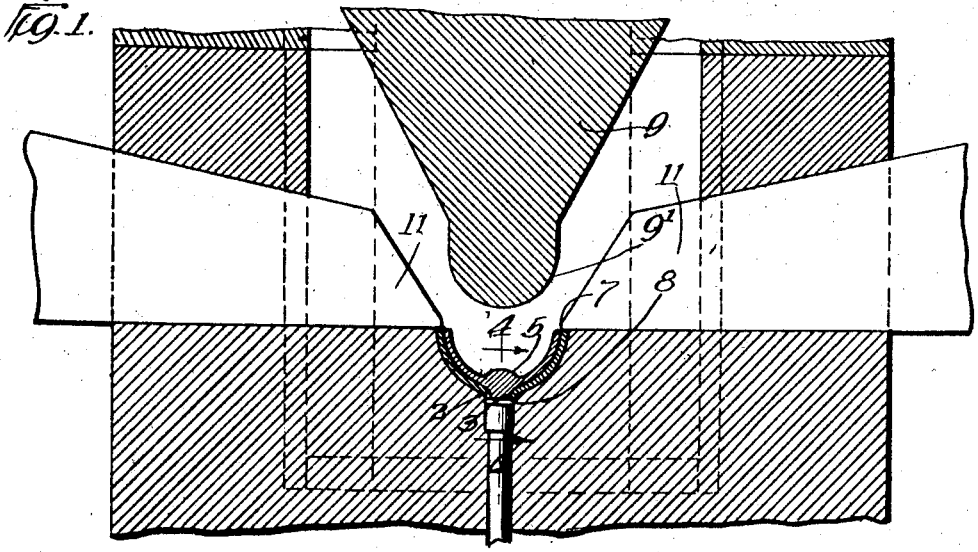
Fig. 1 is a fragmentary, vertical sectional view of a plunger and co-operating die for forming the bearing sleeves, shown before the plunger enters the die.
Figure 2:
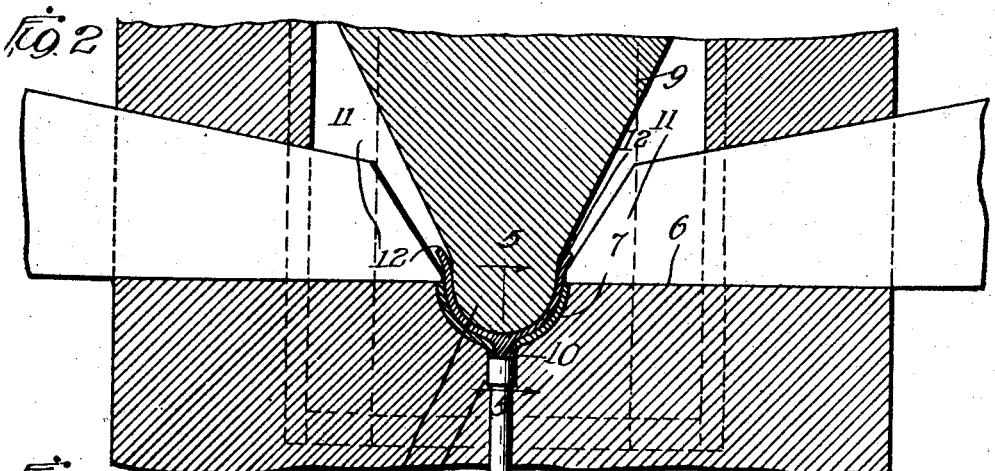
Fig. 2 is a view similar to Fig. 1 but showing the plunger and die as they appear at the close of the forming operation.

In Figs. 1 and 2 herein, I have illustrated such dies which roughly consist of a lower die member 6 having a semi-cylindrical die opening 7 in which the outer semi-cylindrical surface of the sleeve is sized. This die member is provided with a depression 8 in its bottom adapted to size the projection which it is desired to produce upon the back of the sleeve. There is a co-operating plunger on die member 9 having a semi-cylindrical lower end 9' which co-operates with the opening 7 to form the inner surface of the sleeve.

The upper member 9 is moved up and down by means of a suitable press mechanism, not shown. When the upper die member enters the lower member and is forced down to its limit, it is forced down with sufficient pressure to cause the Babbitt metal lining 4, which is thicker radially than the finished product, to be thinned out and at the final position of the dies the radial thickness is that which is desired in the finished sleeve. To prevent the circumferential elongation of the backing beyond the dimensions of the finished shell, closures 11 for the upper edges of the die space are provided. These closures 11 also operate to define the extrusion slots at the sides of the die member 9 through which any excess Babbitt metal may be forced, as shown at 12, Fig. 2.

In this pressing step the first action of the plunger 9 is to contact with the excrescense 5 and force the Babbitt metal through the opening 3 and to fill the depression 8 in the bottom of the lower die.

Figure 5:
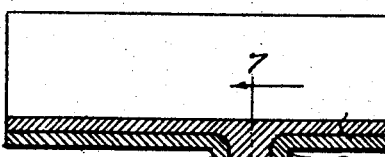
Fig. 5 is a central longitudinal section of the finished bearing and taken on the line 5—5 of Fig. 2.
Figure 6:
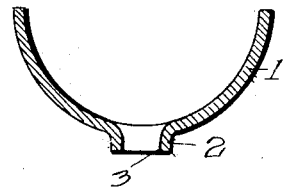
Fig. 6 is a cross-section of the backing sleeve on the line 6—6 of Fig. 3.
Figure 7:
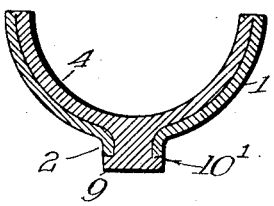
Fig. 7 is a cross-section of the finished sleeve taken on the line 7—7 of Fig. 5.

The tremendous pressure to which the metal is subjected causes it to completely fill the depression 8 and even causes the thimble 2 to expand and be sized on its outer surface by the wall of the depression 8, forcing the Babbitt metal out through the opening and forming a Babbitt metal button 10 at the outer end of the projection 2, thus completing and finishing the doweling projection as shown at 10, Figs. 5 and 7. It is obvious that any marking desired can be impressed in the outer flat surface of the finished doweling projection, as shown in Fig. 2, by merely building up the design wanted on the bottom of the depression 8.

Figure 8:
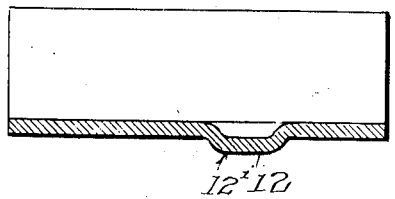
Fig. 8 is a view similar to Fig. 3, but showing a backing wherein the projection is not perforated.
Figure 9:
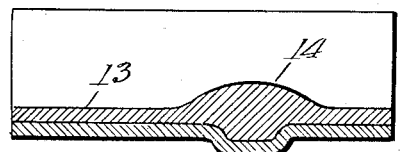
Fig. 9 is a view similar to Fig. 4 but showing a non-perforated projection on the backing.
Figure 10:
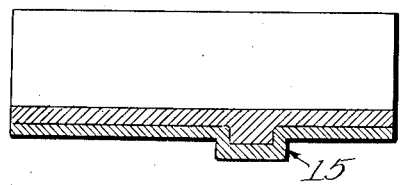
Fig. 10 is a view of a finished sleeve made with a non-perforated projection on the backing.

In some instances it is best not to cut out the bottom of the partly formed projection and Figs. 8, 9 and 10 illustrate this method.

Fig. 8 is a longitudinal section of a prepared backing having a doweling projection 11 partly formed but the bottom 12 of which has not been cut out as in the former case.

The following procedure is quite similar to that already described in that after the backing is partly formed, as shown in Fig. 8, it is then tinned and the Babbitt metal lining 13 is cast in place, thicker radially than the finishing lining and with an excrescence 14 on the inside opposite to the partly formed doweling projection 11. Then the sleeve is formed by pressure as already described, the first action being to press down on the excrescence 14 causing the Babbitt metal to force the partly formed doweling projection 11 down into the depression 8 in the lower die member and thus accurately finish and size the doweling projection at the same time that the shell is completed in the press. This completed doweling projection is shown at 15, Fig. 10.

Under some conditions it is not desired to make use of a harder metal backing but to make the whole sleeve of Babbitt metal. For this purpose it is preferred to cast a sleeve blank preparatory to the forming step but such is not an absolute necessity, it being necessary merely that sufficient Babbitt metal be present in the lower die so that when the upper member is forced in to its limit all of the die space will be completely filled with the Babbitt metal.

Figures 11, 12:
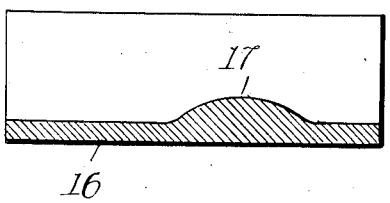
Fig. 11 is a view similar to Figs. 4 and 9 but showing a sleeve made entirely of Babbitt metal, that is without a harder metal back.
Fig. 12 is a view similar to Figs. 5 and 10 and showing the all Babbitt sleeve in finished condition.
Figure 13:
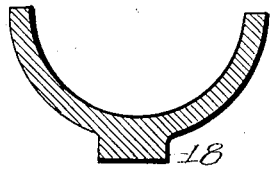
Fig. 13 is a transverse section on the line 13—13 of Fig. 12.

When a pre-cast sleeve blank is used, as shown in Fig. 11, at 16, it, like the previously described sleeves is provided with an excrescence 17 on its inner side and opposite to the place where the doweling projection is desired. During the pressing step the Babbitt metal is forced out into the dowel depression 8 in the lower die producing the finished dowel projection, as shown at 18 Figs. 12 and 13.

It is thus seen that by means of this invention a solid or integral doweling projection is cheaply and accurately produced upon the back of a finished bearing sleeve.

As many modifications of my invention will readily suggest themselves to one skilled in the art I do not limit or confine my invention to the specific details of construction or method steps herein described and claimed.

The improved method herein illustrated and described is not claimed herein, such forming the subject matter of my co-pending application filed February 29, 1932, Serial No. 595,885.

I claim:

1. A semi-cylindrical bearing sleeve, accurately finished as to dimensions and surfaces and having an integral doweling projection on its outer surface, the sleeve having a Babbitt or similar bearing metal lining and a harder metal backing, the doweling projection including a hollow preformed projection on the back of the harder metal backing.

2. A semi-cylindrical bearing sleeve, accurately finished as to dimensions and surfaces and having an integral doweling projection on its outer surface, the sleeve having a Babbitt or similar bearing metal lining and a harder metal backing, the doweling projection including a hollow preformed projection on the back of the harder metal backing the bottom of such preformed projection perforated, and the Babbitt metal having been forced through said opening to form the outer end of the doweling projection.

3. A bearing sleeve comprising an outer relatively thin backing of a relatively harder metal and an inner lining of a relatively softer bearing metal, the sleeve having an outer finished cylindrical surface, a projection on said surface formed partly from the metal of the backing and partly from the metal of the lining.

4. A bearing sleeve comprising an outer relatively thin backing of a relatively harder metal and an inner lining of a relatively softer bearing metal, the sleeve having an outer finished cylindrical surface, a projection on said surface having a rim formed out of the metal of the back and its outer end formed out of the metal of the lining.

5. A bearing sleeve comprising an outer relatively thin backing of a relatively harder metal and an inner lining of a relatively softer bearing, the metal of the back forced outwardly to form part of said projection on said outer cylindrical surface and the metal of the lining forced through same to form the outer end thereof.

6. A bearing sleeve comprising an outer relatively thin backing of a relatively harder metal and an inner lining of a relatively softer bearing metal, the metal of the back formed outwardly to provide a hollow projection on said outer cylindrical surface, and the metal of the lining filling said projection.

In witness that I claim the foregoing as my invention, I affix my signature this 12th day of May, 1928.

BERGER STOCKFLETH.